(12) United States Patent
Manikantan Shila et al.

(10) Patent No.: US 11,032,705 B2
(45) Date of Patent: Jun. 8, 2021

(54) SYSTEM AND METHOD FOR AUTHENTICATING USER BASED ON PATH LOCATION

(71) Applicant: Carrier Corporation, Palm Beach Gardens, FL (US)

(72) Inventors: Devu Manikantan Shila, West Hartford, CT (US); Shirish Kumar Singh, East Hartford, CT (US); Emeka P. Eyisi, West Hartford, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/416,613

(22) Filed: May 20, 2019

(65) Prior Publication Data

US 2020/0037162 A1 Jan. 30, 2020

Related U.S. Application Data

(60) Provisional application No. 62/702,521, filed on Jul. 24, 2018.

(51) Int. Cl.
*H04W 12/065* (2021.01)
*H04W 4/029* (2018.01)
*H04W 12/08* (2021.01)

(52) U.S. Cl.
CPC ......... *H04W 12/065* (2021.01); *H04W 4/029* (2018.02); *H04W 12/08* (2013.01)

(58) Field of Classification Search
CPC .. H04W 12/0605; H04W 12/08; H04W 4/029
See application file for complete search history.

(56) References Cited

U.S. PATENT DOCUMENTS

| 8,447,272 | B2 | 5/2013 | Faith et al. |
| 9,119,068 | B1 | 8/2015 | Hubble |
| 9,832,206 | B2 | 11/2017 | Mare et al. |
| 9,875,347 | B2 | 1/2018 | Baghdasaryan |
| 9,953,149 | B2 | 4/2018 | Tussy |
| 10,708,278 | B1* | 7/2020 | Cuan .................... H04L 9/3228 |
| 2007/0236330 | A1 | 10/2007 | Cho et al. |
| 2011/0148633 | A1* | 6/2011 | Kohlenberg ........... G06F 21/30 340/541 |

(Continued)

FOREIGN PATENT DOCUMENTS

| KR | 20060124058 A | 12/2006 |
| WO | 2017095775 A1 | 6/2017 |

OTHER PUBLICATIONS

Robertas Damaševičius, et al., Smartphone User Identity Verification Using Gait Characteristics, Symmetry, 2016, 8, 100;doi:10.3390/sym8100100, pp. 1-20 < http://www.mdpi.com/2073-8994/8/10/100/pdf >.

(Continued)

*Primary Examiner* — Steven S Kelley
(74) *Attorney, Agent, or Firm* — Bachman & LaPointe, P.C.

(57) ABSTRACT

A passive authenticating system includes a mobile device in communication with at least one of a multiple of access controls, the mobile device operable to determine a path trajectory of a user to authenticate the user based at least in part on the path trajectory then permit passive access to a particular access control.

17 Claims, 5 Drawing Sheets

(56) References Cited

U.S. PATENT DOCUMENTS

| | | | |
|---|---|---|---|
| 2012/0280783 A1* | 11/2012 | Gerhardt | H04L 63/0428 340/5.6 |
| 2013/0102283 A1* | 4/2013 | Lau | H04W 12/06 455/411 |
| 2014/0266585 A1* | 9/2014 | Chao | H04W 4/50 340/5.61 |
| 2015/0018018 A1* | 1/2015 | Shen | G01C 21/08 455/457 |
| 2015/0230060 A1* | 8/2015 | Sung | G01C 21/28 455/456.6 |
| 2015/0287296 A1* | 10/2015 | Hall | G08B 13/19697 340/541 |
| 2015/0288687 A1 | 10/2015 | Heshmati et al. | |
| 2016/0226865 A1 | 8/2016 | Chen et al. | |
| 2017/0013464 A1 | 1/2017 | Fish et al. | |

OTHER PUBLICATIONS

Christopher Mims, Smart Phones that Know Their Users by How They Walk, Sep. 16, 2010 < https://www.technologyreview.com/s/420835/smart-phones-that-know-their-users-by-how-they-walk/ >.

Bayat, Akram et al., Classifying Human Walking Patterns Using Accelerometer Data From Smartphone, International Journal of Computer Science and Mobile Computing, IJCSMC, vol. 6, Issue 12, Dec. 2017, p. 78-83 < https://ijcsmc.com/docs/papers/December2017/V6I12201714.pdf >.

Nickel, Claudia, et al., "Authentication of Smartphone Users Based on the Way they Walk Using k-NN Algorithm", IIH-MSP, 2012 Eighth International Conference, < https://www.technologyreview.com/s/420835/smart-phones-that-now-their-users-by-how-they-walk/ >.

* cited by examiner

SYSTEM AND METHOD FOR AUTHENTICATING USER BASED ON PATH LOCATION

CROSS-REFERENCE TO RELATED APPLICATIONS

This application claims the benefit of provisional application Ser. No. 62/702,521, filed Jul. 24, 2018.

U.S. GOVERNMENT RIGHTS

This disclosure was made with Government support under D15PC0155 awarded by The United States Department of Homeland Security. The Government has certain rights in this disclosure.

BACKGROUND

The present disclosure relates generally to authenticating a user within a security region, and more particularly, to a system and a method of authenticating a user based on movement thereof.

An access control system is typically operated by encoding security data on a physical key card that indicates access rights when presented to an access control. Such systems can require ongoing active authenticating of a user that may be cumbersome and time consuming when used within a security region which includes numerous access controls such as within a secure building. Further, such systems do not preclude unauthorized usage of another's key card.

Implicitly and passively authenticating a user within a security region is challenging. Behavioral traits such as user walking patterns and location have been used to implicitly and passively authenticate a user. Typically, location is inferred from a GPS trace of the user. However, GPS often performs poorly inside a building and may not provide sufficiently fine-grained location. Also, haptics of a user such as the user's gait may not be a reliable indicator as such haptics may change over time or even throughout the day.

SUMMARY

A passive authenticating system according to one disclosed non-limiting embodiment of the present disclosure includes a mobile device in communication with at least one of a multiple of access controls, the mobile device operable to determine a path trajectory of a user in relation to an emission map of a security region to authenticate the user based at least in part on the path trajectory of the user, then permit access to a particular access control of the multiple of access controls.

A further embodiment of any of the foregoing embodiments of the present disclosure includes that the mobile device is operable to determine the path trajectory via identification of one or more of the multiple of access controls.

A further embodiment of any of the foregoing embodiments of the present disclosure includes that the identification is performed by a magnetometer on the mobile device.

A further embodiment of any of the foregoing embodiments of the present disclosure includes that the identification is performed by a sensor on the mobile device that determines a signal strength from one or more of the multiple of access controls.

A further embodiment of any of the foregoing embodiments of the present disclosure includes that the mobile device is operable to determine the path trajectory via an accelerometer on of the mobile device.

A further embodiment of any of the foregoing embodiments of the present disclosure includes that the mobile device is operable to determine the path trajectory based at least in part on a received signal strength indicator (RSSI) on the mobile device.

A further embodiment of any of the foregoing embodiments of the present disclosure includes that the mobile device is operable to determine the path trajectory at least in part on a Wi-Fi signal strength on the mobile device.

A further embodiment of any of the foregoing embodiments of the present disclosure includes that the mobile device is operable to determine the path trajectory via a gyroscope on of the mobile device.

A further embodiment of any of the foregoing embodiments of the present disclosure includes that the path trajectory is associated with a time.

A further embodiment of any of the foregoing embodiments of the present disclosure includes that the path trajectory is associated with one or more of the multiple of access controls.

A further embodiment of any of the foregoing embodiments of the present disclosure includes that the access control is a lock.

A further embodiment of any of the foregoing embodiments of the present disclosure includes that the mobile device is a smartphone.

A method of passively authenticating a user according to one disclosed non-limiting embodiment of the present disclosure includes determining a path trajectory of a user in relation to an emission map of a security region; authenticating the user in response to the path trajectory; and permitting access to an access control in response to the authenticating.

A further embodiment of any of the foregoing embodiments of the present disclosure includes that determining the path trajectory of the user is performed at least in part by a magnetometer on the mobile device.

A further embodiment of any of the foregoing embodiments of the present disclosure includes that determining the path trajectory of the user is performed at least in part by an accelerometer on the mobile device.

A further embodiment of any of the foregoing embodiments of the present disclosure includes that determining the path trajectory of the user is performed at least in part by a received signal strength indicator (RSSI) on the mobile device.

A further embodiment of any of the foregoing embodiments of the present disclosure includes that determining the path trajectory of the user is performed at least in part by a Wi-Fi signal strength on the mobile device.

A further embodiment of any of the foregoing embodiments of the present disclosure includes matching the path trajectory of the user with a predetermined path trajectory of the user.

A further embodiment of any of the foregoing embodiments of the present disclosure includes matching the path trajectory of the user with a predetermined path trajectory of the user within a particular time frame.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
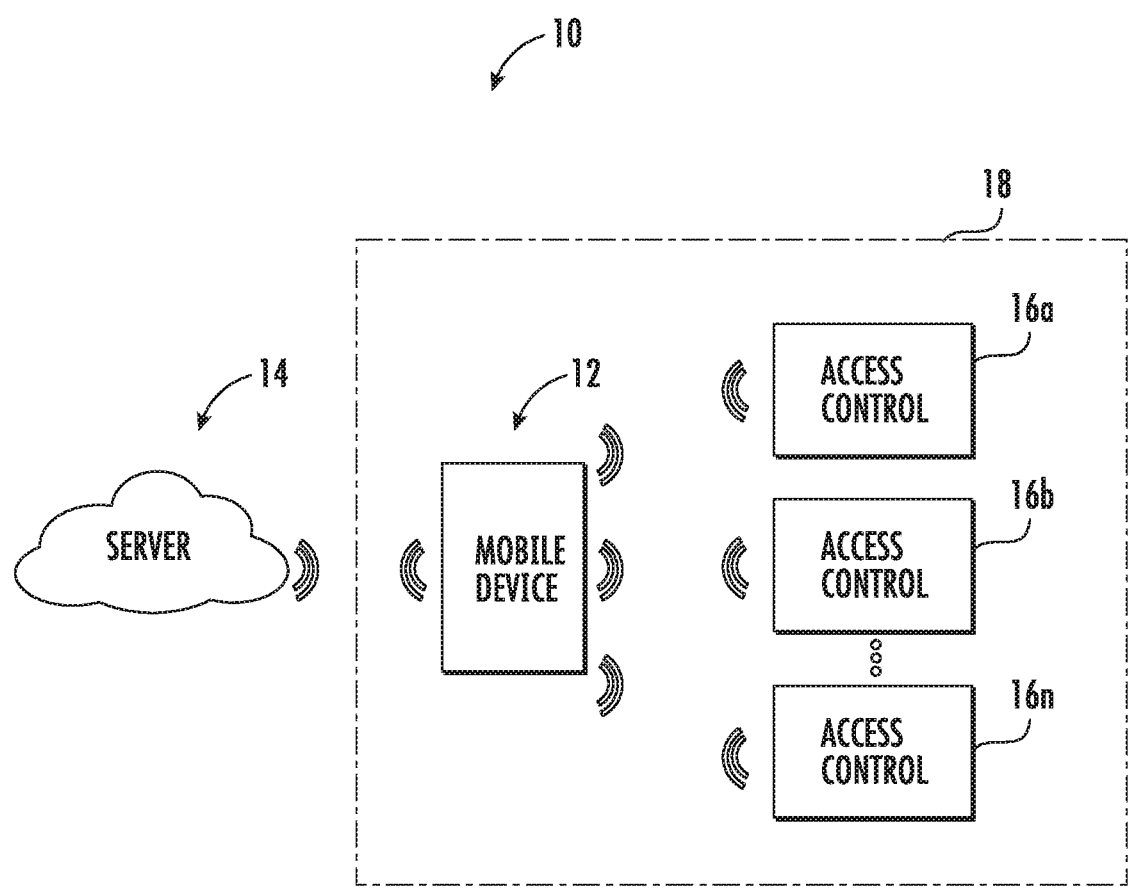
FIG. 1 is a general schematic system diagram of an access control system.

FIG. 1 schematically illustrates an access control system 10. The system 10 generally includes a mobile device 12, a server 14, and a plurality of access controls 16, schematically illustrated as 16a, 16b, . . . , 16n that are located within a secure region 18 such as a building or other area. It should be appreciated that, although particular systems are separately defined in the schematic block diagrams, each or any of the systems may be otherwise combined or separated via hardware and/or software.

The mobile device 12 is a wireless capable handheld device such as a smartphone that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 communicates to receive, for example, credentials and other data.

Each access control 16 is a wireless-capable, restricted-access, or restricted-use device such as wireless locks, access control readers for room entry, dispensing devices, and other restricted-use machines. The mobile device 12 submits credentials to the access controls 16, thereby selectively permitting a user to access or activate functions of the access controls 16. A user may, for example, passively submit a credential to an electromechanical lock to unlock it, and thereby gain access to a restricted area. Some credentials may be used for multiple access controls 16. For example, a plurality of electronic locks in a facility may respond to the same credential. Other credentials may be specific to a single access control 16.

Figure 2:
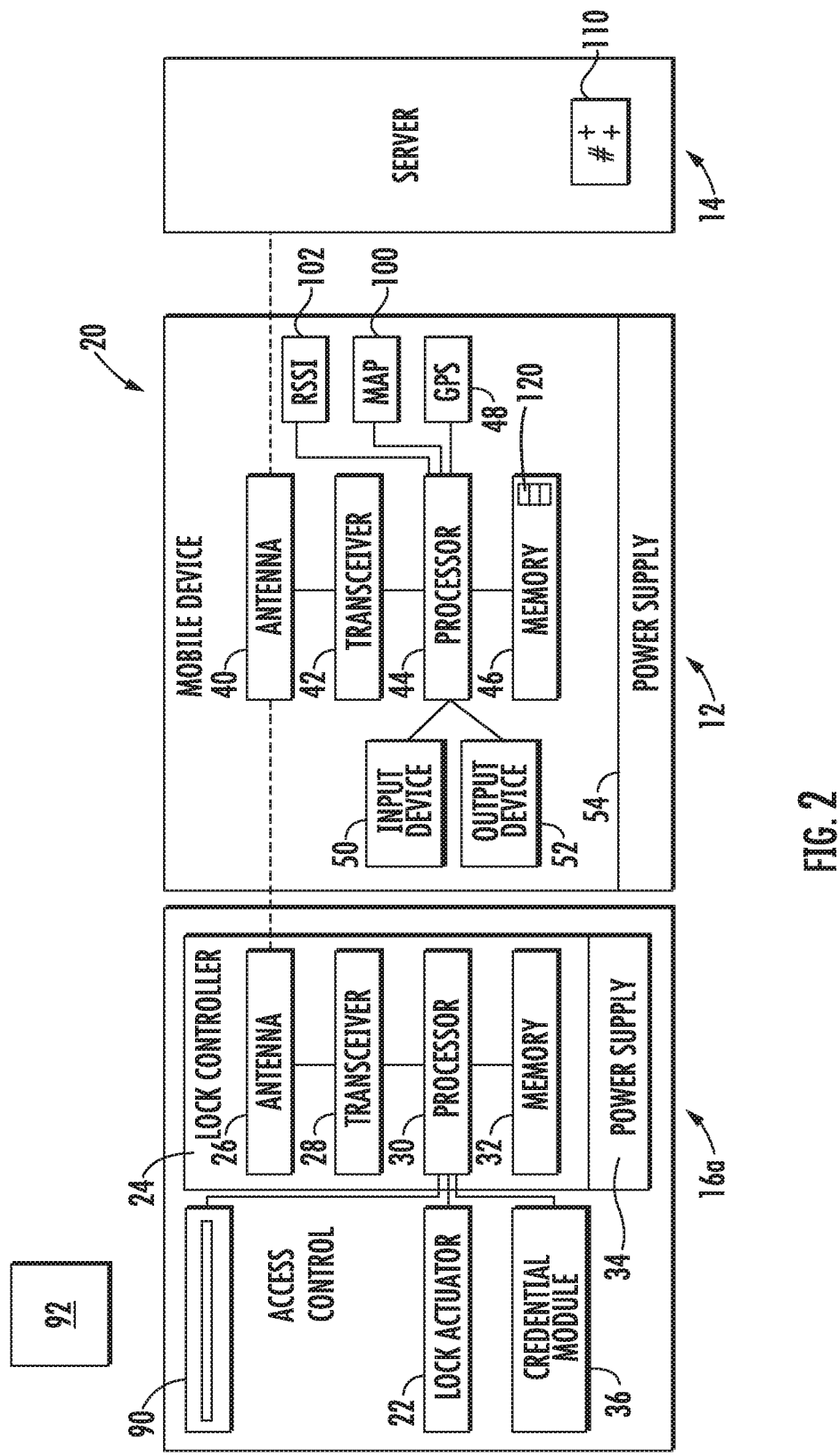
FIG. 2 is a block diagram of an example electronic lock system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and a lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and, in this embodiment, a mobile credential is retrieved in real time and is passed to the credential module 36 without storing first in the key memory 46 on the mobile device 12.

The mobile device 12 may also include positional sensors such as a magnetometer 100 and a received signal strength indicator (RSSI) 102. The magnetometer 100 typically creates essentially a miniature Hall-effect sensor that detects the Earth's magnetic field along three perpendicular axes X, Y and Z. The X, Y, and Z axis sensor positional data positions the user within the secure region 18 and tracks path trajectory, speed, etc. That is, the secure region 18 may be mapped with respect to magnetometer, Bluetooth, and/or other emission data from the access controls 16 and other sources to generate an emission map 110 for each respective secure region 18. The maps 110 may be constructed by an installer technician and can be referred to as a generic indoor location model. The maps 110 are stored in the server 14 for access by the mobile device 12 via a security application 120 stored on the mobile device that determines a path trajectory of a user to authenticate the user based at least in part on the path trajectory of the user.

Figure 3:
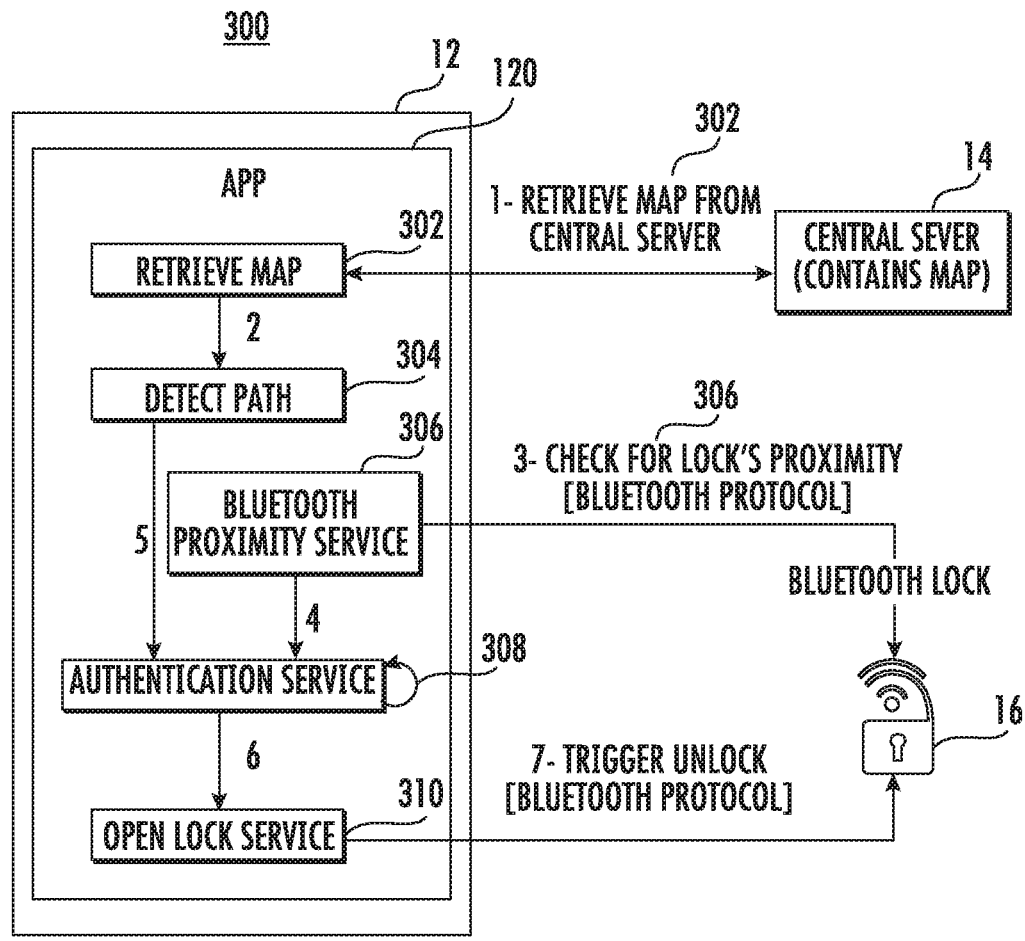
FIG. 3 is a flowchart of a method for operating the access control system.

With reference to FIG. 3 a method 300 for operating the access control system 10 to passively authenticates a user within the security region 18 is schematically illustrated. The functions are programmed software routines capable of execution in various microprocessor based electronics control embodiments and are represented herein as block diagrams.

Figure 4:
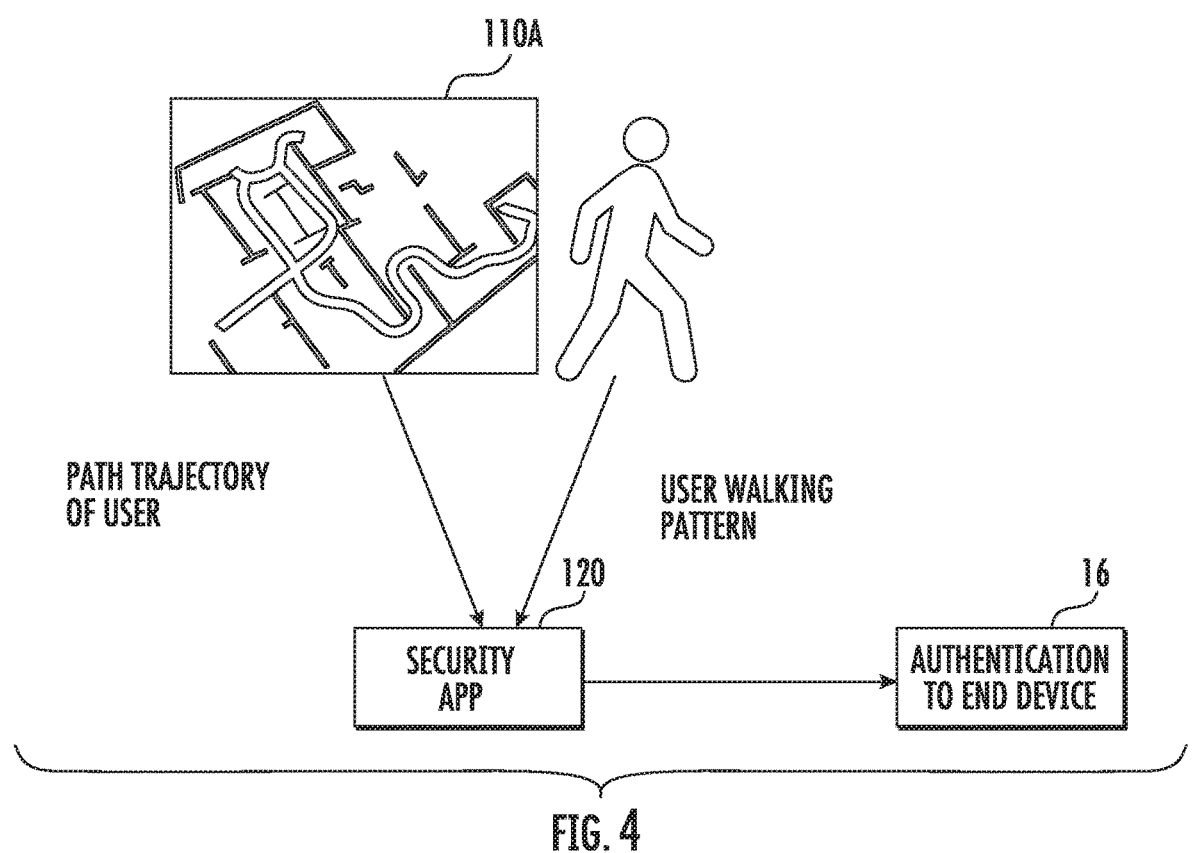
FIG. 4 is a general schematic of the access control system to passively authenticate a user within a security region.

Initially, the security application 120 identifies a particular user with the server 14 then downloads or retrieves (step 302) the appropriate map of the secure region 18. Then, the mobile device 12 reads the magnetometer, and/or other positional data to detect (step 304) the locations and paths taken by the user moving within the security region 18 to define a map 110A specific to the user (FIG. 4). Although GPS can be utilized, GPS may not provide the necessary fine-grained location data. Further, the distribution of the access controls 16 within the secure region 18 provide a unique magnetometer signature for creation of the map 110 in a self-contained system environment. The received signal strength indicator (RSSI) 102 determines the user path trajectory and also determines proximity (step 306) to the access controls 16 within the secure region 18. This may be referred to as a specific path trace model that trains the security application 120 with respect to the specific user. Once in proximity, the access control system 10 either passively authenticates (step 308; FIG. 3) the user and opens the access control 16 (step 310) upon user approach, or requires further confirmation if a desired confidence is not attained.

Figure 5:
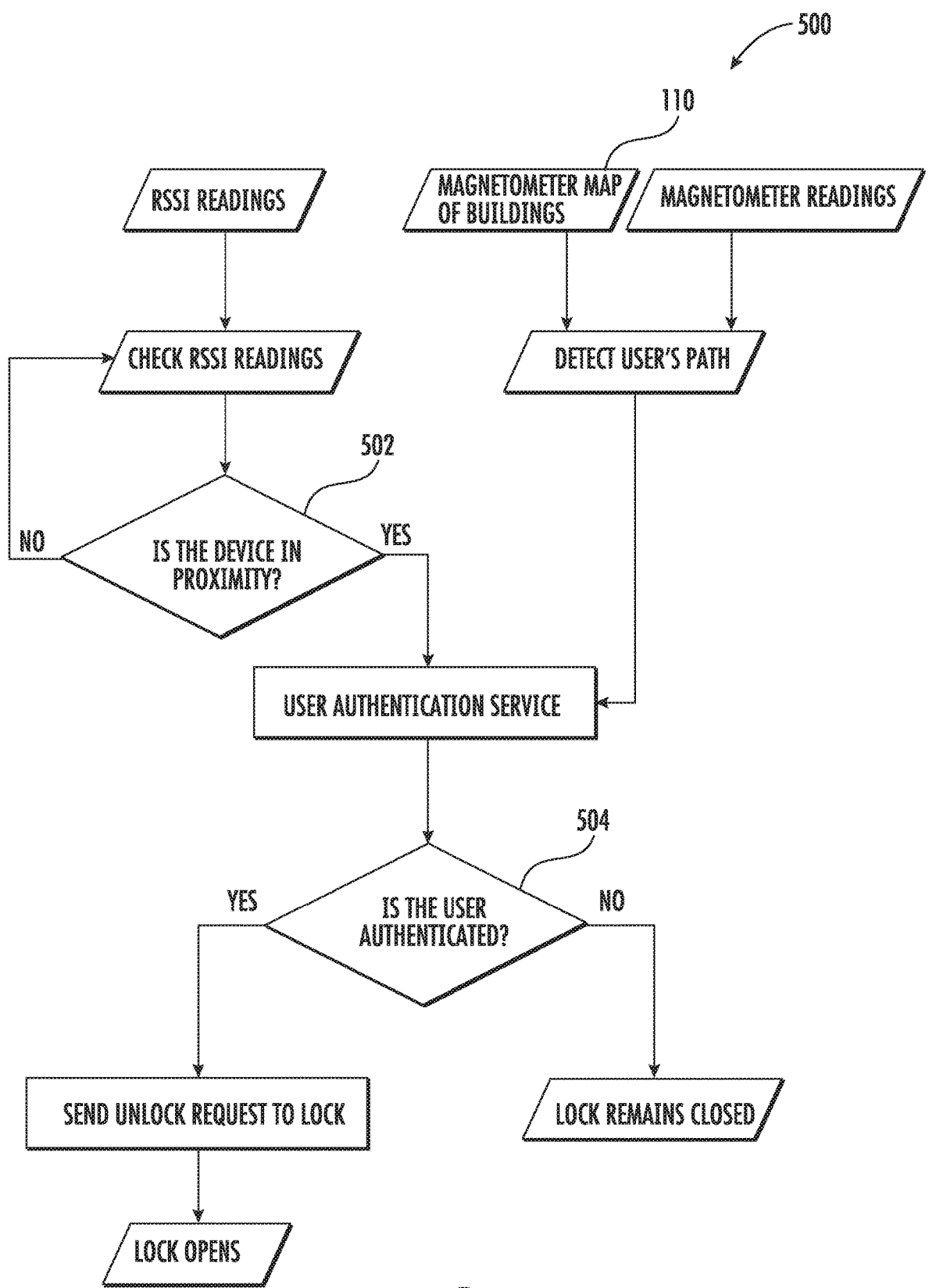
FIG. 5 is a flowchart of a method to passively authenticate the user within a security region.

With reference to FIG. 5, a method 500 of passively authenticating a user within the security region 18 with the security application 120 initially includes determining whether the user is within a predefined proximity 502 to a particular access control 16 from the received signal strength indicator (RSSI) 102. If within the predefined proximity 502 to the particular access control 16, the users path trajectory from the magnetometer readings are determined with respect to the map 120 as the user travels within the security region 18.

The particular user's path trajectory is then used to authenticate 504 the user within the security region 18. That is, the user path trajectories are utilized to build user-specific path trajectory profiles that define the probability of identifying a particular user given that users path trajectory and then uses that learned path trajectory profile to authenticate the user. As an authenticated user's path trajectory to reach the access control may be different from an intruder's path, the path trajectories can be used to authenticate the user. Alternatively or additionally, other haptic factors such as gait, time of day, etc., may be used in conjunction with the user path trajectories.

The security application 120 then predicts the authentication probability of the actual user given the most recent path trajectory of the user. If the prediction is high, the security application 120 automatically issues an open message to the access control 16. Otherwise the user will have to authenticate via other conventional procedures such as the physical key card 92. Thus even if an intruder gains custody of an authorized user's mobile device 12, the intruder will likely take a different path than that known to be taken by the authorized user.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A passive authenticating system, comprising:
a multiple of locks, each of which includes a wireless transmitter; and
a mobile device in communication with at least one of the multiple of locks, the mobile device including a transceiver and a processor, wherein the mobile device processor and transceiver are configured to:

receive an emission map from one of the multiple of locks;

determine a path trajectory of a user in relation to the emission map of a security region to authenticate the user based at least in part on the path trajectory of the user wherein the mobile device determines the path trajectory via identification of signals received from the multiple of locks, then permit passive access to a particular lock of the multiple of locks in response to the authentication of the user, wherein emission data from the multiple of locks generates the emission map for a secure region, the path trajectory is associated with one or more of the multiple of locks transmit authentication information to the one of the multiple of locks;

wherein the one of the multiple of locks is configured to permit passive access to the lock as the mobile device approaches the lock.

2. The system as recited in claim 1, wherein the identification is performed by a magnetometer on the mobile device.

3. The system as recited in claim 1, wherein the identification is performed by a sensor on the mobile device that determines a signal strength from one or more of the multiple of locks.

4. The system as recited in claim 1, wherein the mobile device is operable to determine the path trajectory via an accelerometer on of the mobile device.

5. The system as recited in claim 1, wherein the mobile device is operable to determine the path trajectory based at least in part on a received signal strength indicator (RSSI) on the mobile device.

6. The system as recited in claim 1, wherein the mobile device is operable to determine the path trajectory at least in part on a Wi-Fi signal strength on the mobile device.

7. The system as recited in claim 1, wherein the mobile device is operable to determine the path trajectory via a gyroscope on of the mobile device.

8. The system as recited in claim 1, wherein the path trajectory is associated with a time.

9. The system as recited in claim 1, wherein the mobile device is a smartphone.

10. A method of passively authenticating a user, comprising:

receiving, by a mobile device, an emission map transmitted wirelessly from a transceiver within one of a multiple of locks;

determining a path trajectory of a user in relation to the emission map of a security region, wherein the mobile device of the user determines the path trajectory via identification of signals received from one or more of a multiple of locks and the path trajectory is associated with one or more of the multiple of locks;

authenticating, by the mobile device, the user in response to the path trajectory;

transmitting, by the mobile device, authenticating information to the one of the multiple locks;

permitting, by the one of the multiple of locks, passive access to a lock in response to the authenticating information as the mobile device approaches the lock.

11. The method as recited in claim 10, wherein determining the path trajectory of the user is performed at least in part by a magnetometer on the mobile device.

12. The method as recited in claim 10, wherein determining the path trajectory of the user is performed at least in part by an accelerometer on the mobile device.

13. The method as recited in claim 10, wherein determining the path trajectory of the user is performed at least in part by a received signal strength indicator (RSSI) on the mobile device.

14. The method as recited in claim 10, wherein determining the path trajectory of the user is performed at least in part by a Wi-Fi signal strength on the mobile device.

15. The method as recited in claim 10, wherein authenticating the user in response to the path trajectory comprises matching the path trajectory of the user with a predetermined path trajectory of the user.

16. The method as recited in claim 10, wherein authenticating the user in response to the path trajectory comprises matching the path trajectory of the user with a predetermined path trajectory of the user within a particular time frame.

17. The method as recited in claim 10, wherein permitting passive access to the lock in response to the authenticating comprises passively submitting a credential to an electromechanical lock to unlock it, and thereby gain access to a restricted area.

* * * * *